United States Patent
Zhuang et al.

(10) Patent No.: US 11,924,103 B2
(45) Date of Patent: Mar. 5, 2024

(54) TRAFFIC PROCESSING METHOD, APPARATUS, AND NETWORK DEVICE

(71) Applicant: Huawei Technologies Co., Ltd., Shenzhen (CN)

(72) Inventors: Shunwan Zhuang, Beijing (CN); Haibo Wang, Beijing (CN); Yunan Gu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/188,016

(22) Filed: Mar. 22, 2023

(65) Prior Publication Data

US 2023/0239242 A1 Jul. 27, 2023

Related U.S. Application Data

(63) Continuation of application No. PCT/CN2021/118136, filed on Sep. 14, 2021.

(30) Foreign Application Priority Data

Sep. 22, 2020 (CN) .......................... 202011002452.5

(51) Int. Cl.
*H04L 45/748* (2022.01)
*H04L 45/24* (2022.01)
*H04L 45/302* (2022.01)

(52) U.S. Cl.
CPC ............ *H04L 45/748* (2013.01); *H04L 45/24* (2013.01); *H04L 45/3065* (2013.01)

(58) Field of Classification Search
None
See application file for complete search history.

(56) References Cited

U.S. PATENT DOCUMENTS

2019/0104060 A1* 4/2019 Wang ...................... H04L 45/22

FOREIGN PATENT DOCUMENTS

| CN | 107566298 B | 11/2021 | |
| WO | WO-2017198131 A1 * | 11/2017 | ............. H04L 45/02 |
| WO | 2019135249 A1 | 7/2019 | |
| WO | 2020043107 A1 | 3/2020 | |

* cited by examiner

*Primary Examiner* — Brian Whipple
(74) *Attorney, Agent, or Firm* — Conley Rose, P.C.

(57) ABSTRACT

A network device obtains Border Gateway Protocol (BGP) flow specification (FlowSpec) information, and generates, based on the BGP FlowSpec information, a first forwarding information base (FIB) table entry including a first prefix and an action, where the BGP FlowSpec information indicates to perform an action on traffic matching a filter condition, where the filter condition includes an attribute of a destination address, where the first FIB table entry indicates the network device to perform the action on the traffic matching the first prefix, and where an attribute of the first prefix is the same as the attribute of the destination address in the filter condition.

20 Claims, 7 Drawing Sheets

TRAFFIC PROCESSING METHOD, APPARATUS, AND NETWORK DEVICE

CROSS-REFERENCE TO RELATED APPLICATIONS

This is a continuation of International Patent Application No. PCT/CN2021/118136 filed on Sep. 14, 2021, which claims priority to Chinese Patent Application No. 202011002452.5 filed on Sep. 22, 2020. The disclosures of the aforementioned applications are hereby incorporated by reference in their entireties.

TECHNICAL FIELD

This disclosure relates to the field of communication technologies, and in particular, to a traffic processing method, an apparatus, and a network device.

BACKGROUND

Currently, a network device may establish a flow specification (FlowSpec) forwarding table based on obtained Border Gateway Protocol (BGP) FlowSpec information for traffic that needs to be specially controlled. The FlowSpec forwarding table includes a correspondence between a filter condition and an action. The filter condition may include an autonomous system (ASt) number. In addition, the network device further has a forwarding information base (FIB) table. An entry in the FIB table includes correspondences between a prefix, an AS number, and a next hop. For example, the FlowSpec forwarding table includes a correspondence between an AS number and an action. When receiving traffic, the network device first searches the FIB to determine a FIB table entry matching the traffic, where that the FIB table entry matches the traffic means that a destination address of the traffic matches a prefix in the FIB table entry, and then searches a FlowSpec forwarding table, and controls, if it is determined that there is a FlowSpec forwarding table entry corresponding to an AS number in the matched FIB table entry, the traffic based on the action in the matched FlowSpec forwarding table entry.

In the foregoing traffic control manner, the network device needs to perform a plurality of table lookup operations on the received traffic, resulting in relatively low efficiency of processing the traffic by the network device and affecting performance of the network device.

SUMMARY

Embodiments of this disclosure provide a traffic processing method, an apparatus, a device, and a network device. The network device optimizes a FIB table for guiding traffic forwarding, so that received traffic can be controlled based on an action in BGP FlowSpec information by performing only one table lookup operation without processing traffic through a plurality of table lookup operations, thereby improving processing efficiency of the network device.

According to a first aspect, embodiments of this disclosure provide a traffic processing method. A traffic processing process in the method may include: a network device obtains BGP FlowSpec information including a filter condition and an action. The BGP FlowSpec information indicates to perform the action on traffic matching the filter condition. The filter condition includes an attribute of a destination address. In this way, the network device may generate, based on the BGP FlowSpec information, a first FIB table entry including a first prefix and the action. The first FIB table entry indicates the network device to perform the action on traffic matching the first prefix. An attribute of the first prefix is the same as the attribute of the destination address in the filter condition. In this way, the network device only needs to view a FIB table for received traffic to determine that a destination address of the traffic matches the first prefix in the first FIB table entry, so as to process the traffic based on the action in the first FIB table entry, and process the traffic based on the BGP FlowSpec without performing a plurality of table lookup operations on the received traffic, thereby greatly improving efficiency of processing the traffic by the network device and improving performance of the network device.

A manner in which the network device obtains the BGP FlowSpec information may be that the network device receives a control packet sent by a control and management device. The control packet carries the BGP FlowSpec information. The control and management device may be, for example, a controller or a forwarding device. Alternatively, a manner in which the network device obtains the BGP FlowSpec information may be that the network device obtains the BGP FlowSpec information from local configuration information.

The BGP FlowSpec information may be information carried in a BGP FlowSpec route obtained by the network device. The filter condition in the BGP FlowSpec information may indicate a destination address having a specific attribute. Therefore, traffic matching the filter condition is traffic whose destination address has the specific attribute. For example, the attribute of the destination address may be an AS number to which the destination address belongs, or may be a set of AS numbers corresponding to the destination address, or may be a community attribute corresponding to the destination address. The action in the BGP FlowSpec information is an operation that is in the BGP FlowSpec information and that needs to be performed on the traffic matching the filter condition. For example, the action in the BGP FlowSpec information may include any one of the following actions: redirection, packet discarding, rate limiting, or Quality of service (QoS) level setting.

In an example, a process in which the network device generates the first FIB table entry based on the BGP FlowSpec information may include: first, the network device generates a FlowSpec routing table entry based on the BGP FlowSpec information, where a route selection priority of the FlowSpec routing table entry is higher than a route selection priority of another routing table entry, and the other routing table entry is obtained based on another routing protocol or through static configuration. The other routing protocol includes, but is not limited to, a BGP or an interior gateway protocol (IGP). Then, the network device may send the FlowSpec routing table entry to a route management (RM) routing table, where the FlowSpec routing table entry is used as an RM routing table entry in the RM routing table. Finally, the network device sends the RM routing table entry (including the FlowSpec routing table entry generated based on the BGP FlowSpec information) in the RM routing table to the FIB table, where the RM routing table entry is used as the first FIB table entry. The sending the RM routing table entry in the RM routing table to the FIB table based on route selection priorities of entries in the RM routing table may be, for example, sending all RM routing table entries corresponding to various route selection priorities in the RM routing table to the FIB table, and reflecting, in the FIB table, route selection priorities of FIB table entries corresponding to the RM routing table entries, where a FIB table entry with a highest route selection priority in the FIB table is the first FIB table entry; or may be sending RM routing table entries whose route selection priority is lower than a preset threshold in the RM routing table to the FIB table, and reflecting, in the FIB table, route selection priorities of FIB table entries corresponding to the RM routing table entries, where a FIB table entry with a highest route selection priority in the FIB table is the first FIB table entry; or may be sending an RM routing table entry (that is, a FlowSpec routing table entry) with a highest route selection priority in the RM routing table to the FIB table, so that the FlowSpec routing table entry in the FIB table is the first FIB table entry. It should be noted that at least two FIB table entries with a same prefix are stored in the FIB table, so as to ensure that when a link or a network device on a link indicated by a FIB table entry fails, traffic forwarding is guided based on the other FIB table entry with the same prefix.

The route selection priorities in this example may be values set by the network device for various routes based on actual requirements and for determining priorities of the routes. Generally, the route selection priorities of the routes range from 0 to 255. The smaller the value of the route selection priority, the higher the route selection priority of the corresponding route.

If the network device needs to withdraw the BGP FlowSpec route, to withdraw, in batches, the routing table entries corresponding to the BGP FlowSpec route and FIB table entries corresponding to the BGP FlowSpec route, the traffic processing process in this example may further include: the network device obtains first withdrawal information. The first withdrawal information indicates to perform a withdrawal operation on the BGP FlowSpec information. In this way, the network device withdraws the FlowSpec routing table entry based on the first withdrawal information. Therefore, the RM routing table entry corresponding to the FlowSpec routing table entry in the RM routing table may be further deleted, and the FIB table entry corresponding to the BGP FlowSpec information may be further deleted, or the FIB table entry corresponding to the FlowSpec information is set to be invalid. In this way, the routing table entries corresponding to the BGP FlowSpec route and FIB table entries corresponding to the BGP FlowSpec route are withdrawn in batches, thereby reducing configuration and maintenance costs, making traffic control based on the BGP FlowSpec more flexible, and improving user experience of the network device.

In another example, a process in which the network device generates the first FIB table entry based on the BGP FlowSpec information may include: first, the network device generates a first RM routing table entry based on the BGP FlowSpec information. A route selection priority of the first RM routing table entry is higher than a route selection priority of a second RM routing table entry, and the second RM routing table entry is obtained based on another routing protocol or through static configuration. The other routing protocol includes, but is not limited to, a BGP or an IGP. Then, the network device may send the first RM routing table entry to a FIB table based on route selection priorities of the first RM routing table entry and the second RM routing table entry, where the first RM routing table entry is used as the first FIB table entry. It should be noted that, the second RM routing table entry may also be sent to the FIB table, but a route selection priority of a FIB table entry corresponding to the second RM routing table entry needs to be reflected in the FIB table. It should be noted that, if a plurality of same routing table entries with different route selection priorities exist in both a first RM routing table and a second RM routing table, in addition to delivering only an RM routing table entry with the highest route selection priority to the FIB table, an RM routing table entry with a non-highest route selection priority may also be delivered to the FIB table. In this way, the FIB table entry with the non-highest route selection priority may be used as a backup entry of the corresponding FIB table entry with the highest route selection priority. When the FIB table entry with the highest route selection priority is withdrawn, the backup entry with the non-highest route selection priority can forward traffic in a timely manner, thereby improving the forwarding performance of the network device.

It should be noted that the network device may include a plurality of RM routing tables, the second RM routing table may also be referred to as a general routing table or an Internet Protocol (IP) routing table, and the first RM routing table is a newly established and maintained routing table. Alternatively, the network device may include only one RM routing table, and different routing protocols indicate, in the RM routing table based on labels, RM routing table entries corresponding to the routing protocols.

The route selection priorities in this example may be values set for various RM routing tables based on actual requirements and for determining priorities of the RM routing tables. Generally, the route selection priorities of the RM routing tables can be flexibly set. The smaller the value of the route selection priority, the higher the route selection priority of the corresponding RM routing table. Alternatively, the route selection priorities in this example may be values set by the network device for various routes based on actual requirements and for determining priorities of the routes. The route selection priorities are reflected in RM forwarding table entries of RM forwarding tables. The route selection priorities of the RM routing table entries are reflected by route selection priorities of routes corresponding to the RM routing table entries.

If the network device needs to withdraw the BGP FlowSpec route, to withdraw, in batches, the routing table entries corresponding to the BGP FlowSpec route and FIB table entries corresponding to the BGP FlowSpec route, the traffic processing process in this example may further include: the network device obtains second withdrawal information. The second withdrawal information indicates to perform a withdrawal operation on the BGP FlowSpec information. In this way, the network device withdraws the first RM routing table entry based on the second withdrawal information. In this way, the network device may further delete a FIB table entry corresponding to the BGP FlowSpec information, or set a FIB table entry corresponding to the FlowSpec information to be invalid. In this way, the routing table entries corresponding to the BGP FlowSpec route and FIB table entries corresponding to the BGP FlowSpec route are withdrawn in batches, thereby reducing configuration and maintenance costs, making traffic control based on the BGP FlowSpec more flexible, and improving user experience of the network device.

In some possible implementations, after obtaining the BGP FlowSpec information, the network device may generate a plurality of FIB table entries. For example, in addition to generating a first FIB table entry based on the BGP FlowSpec information, the network device may further generate a second FIB table entry based on the BGP FlowSpec information. The second FIB table entry includes a correspondence between a second prefix and the action, the second FIB table entry indicates the network device to perform the action on traffic matching the second prefix, an attribute of the second prefix is the same as the attribute of the destination address, and the second prefix is different from the first prefix.

In an example, the traffic processing process may further include a process of processing a specific packet by the network device. For example, when receiving a first packet, the network device may first determine whether a destination address of the first packet matches the first prefix in the first FIB table entry, and process the first packet based on the action in the first FIB table entry if the destination address matches the first prefix in the first FIB table entry. In another example, when receiving a second packet, the network device may first determine whether a destination address of the second packet matches the second prefix in the second FIB table entry, and process the second packet based on the action in the second FIB table entry if the destination address matches the second prefix in the second FIB table entry. It can be learned that traffic processing based on the BGP FlowSpec can be implemented by performing one table lookup operation (that is, an operation of looking up a FIB table), thereby greatly improving efficiency of processing traffic by the network device, and improving performance of the network device.

According to a second aspect, embodiments of this disclosure further provide a network device. The network device may include at least a first obtaining unit and a first generation unit. The first obtaining unit is configured to obtain BGP FlowSpec information. The BGP FlowSpec information includes a filter condition and an action, the BGP FlowSpec information indicates to perform the action on traffic matching the filter condition, and the filter condition includes an attribute of a destination address. The first generation unit is configured to generate a first FIB table entry based on the BGP FlowSpec information. The first FIB table entry includes a correspondence between a first prefix and the action, the first FIB table entry indicates the network device to perform the action on traffic matching the first prefix, and an attribute of the first prefix is the same as the attribute of the destination address.

In an example, the network device may further include a receiving unit, a determining unit, and a processing unit. The receiving unit is configured to receive a packet. The determining unit is configured to determine that a destination address of the packet matches the first prefix in the first FIB table entry. The processing unit is configured to process the packet based on the action.

In an example, the first obtaining unit is further configured to receive a control packet sent by a control and management device. The control packet carries the BGP FlowSpec information, and the control and management device includes a controller or a forwarding device. Alternatively, the first obtaining unit is further configured to obtain the BGP FlowSpec information from local configuration information.

The attribute of the destination address in the filter condition may be an AS number to which the destination address belongs or a set of AS numbers corresponding to the destination address. Alternatively, the attribute of the destination address in the filter condition may be a community attribute corresponding to the destination address.

The action in the BGP FlowSpec information includes any one of the following actions: redirection, packet discarding, rate limiting, or QoS level setting.

In some possible implementations, the first generation unit may include a first generation subunit, a first sending subunit, and a second sending subunit. The first generation subunit is configured to generate a FlowSpec routing table entry based on the BGP FlowSpec information. A route selection priority of the FlowSpec routing table entry is higher than a route selection priority of another routing table entry, and the other routing table entry is obtained based on another routing protocol or through static configuration. The first sending subunit is configured to send the FlowSpec routing table entry to an RM routing table, where the FlowSpec routing table entry is used as an RM routing table entry in the RM routing table. The second sending subunit is configured to send the RM routing table entry in the RM routing table to a FIB table based on route selection priorities of entries in the RM routing table, where the RM routing table entry is used as the first FIB table entry.

In this implementation, the network device may further include a second obtaining unit and a first withdrawal unit. The second obtaining unit is configured to obtain first withdrawal information. The first withdrawal information indicates to perform a withdrawal operation on the BGP FlowSpec information. The first withdrawal unit is configured to withdraw the FlowSpec routing table entry based on the first withdrawal information.

In another possible implementation, the first generation unit may also include a second generation unit and a third sending subunit. The second generation subunit is configured to generate a first RM routing table entry based on the BGP FlowSpec information. A route selection priority of the first RM routing table entry is higher than a route selection priority of a second RM routing table entry, and the second RM routing table entry is obtained based on another routing protocol or through static configuration. The third sending subunit is configured to send the first RM routing table entry to a FIB table based on route selection priorities of the first RM routing table entry and the second RM routing table entry, where the first RM routing table entry is used as the first FIB table entry.

In this implementation, the network device may further include a third obtaining unit and a second withdrawal unit. The third obtaining unit is configured to obtain second withdrawal information. The second withdrawal information indicates to perform a withdrawal operation on the BGP FlowSpec information. The second withdrawal unit is configured to withdraw the first RM routing table entry based on the second withdrawal information.

In addition, in the foregoing two possible implementations, the network device may further include a third withdrawal unit. The third withdrawal unit is configured to delete a FIB table entry corresponding to the BGP FlowSpec information, or set a FIB table entry corresponding to the FlowSpec information to be invalid.

The other routing protocol in the foregoing implementation may include: a BGP or an IGP.

In an example, the network device may further include a second generation unit. The second generation unit is configured to generate a second FIB table entry based on the BGP FlowSpec information, where the second FIB table entry includes a correspondence between a second prefix and the action, the second FIB table entry indicates the network device to perform the action on traffic matching the second prefix, an attribute of the second prefix is the same as the attribute of the destination address, and the second prefix is different from the first prefix.

It should be noted that the network device provided in the second aspect is configured to perform the related operations mentioned in the first aspect. For specific implementations and achieved effects of the operations, refer to related descriptions of the first aspect. Details are not described herein again.

According to a third aspect, embodiments of this disclosure further provide a network device, including a memory and a processor. The memory is configured to store program code or instructions. The processor is configured to run the program code or the instructions, to enable the network device to perform the method according to the first aspect.

According to a fourth aspect, embodiments of this disclosure further provide a computer-readable storage medium. The computer-readable storage medium stores program code or instructions. When the program code or the instructions are run on a computer, the computer is enabled to perform the method according to any possible implementation of the first aspect.

According to a fifth aspect, embodiments of this disclosure further provide a computer program product. When the computer program product is run on a network device, the network device is enabled to perform the method according to any possible implementation of the first aspect.

DESCRIPTION OF EMBODIMENTS

BGP FlowSpec is standardized in Request for Comments (RFC) 5575, and means that a correspondence between a filter condition and an action is carried by an extended type of BGP network layer reachability information and an extended community attribute, so that the action corresponding to the filter condition is performed on traffic matching the filter condition, thereby achieving traffic control. Currently, to reduce a quantity of entries of the FlowSpec on a control plane, a solution for optimizing a group of destination addresses to a same AS appears. In this solution, when traffic is processed by using the BGP FlowSpec, a network device needs to perform a plurality of table lookup operations on the received traffic, which deteriorates performance of the network device and reduces efficiency of processing the traffic by the network device.

Based on this, in embodiments of this disclosure, a traffic processing method is provided. The network device can generate a first FIB table entry based on obtained BGP FlowSpec information. The first FIB table entry includes a correspondence between a first prefix and an action. The action is an action included in the BGP FlowSpec information. The first prefix is a prefix having a same attribute as a destination address indicated by a filter condition included in the BGP FlowSpec information. The BGP FlowSpec information indicates to perform the action on traffic matching the filter condition, and the generated first FIB table entry indicates the network device to perform the action on traffic matching the first prefix. Therefore, the network device only needs to view a FIB table for received traffic to determine that the traffic matches the first prefix in the first FIB table entry, so as to process the traffic based on the action in the first FIB table entry, and process the traffic based on the BGP FlowSpec without performing a plurality of table lookup operations on the received traffic, thereby greatly improving efficiency of processing the traffic by the network device and improving performance of the network device.

Figure 1:
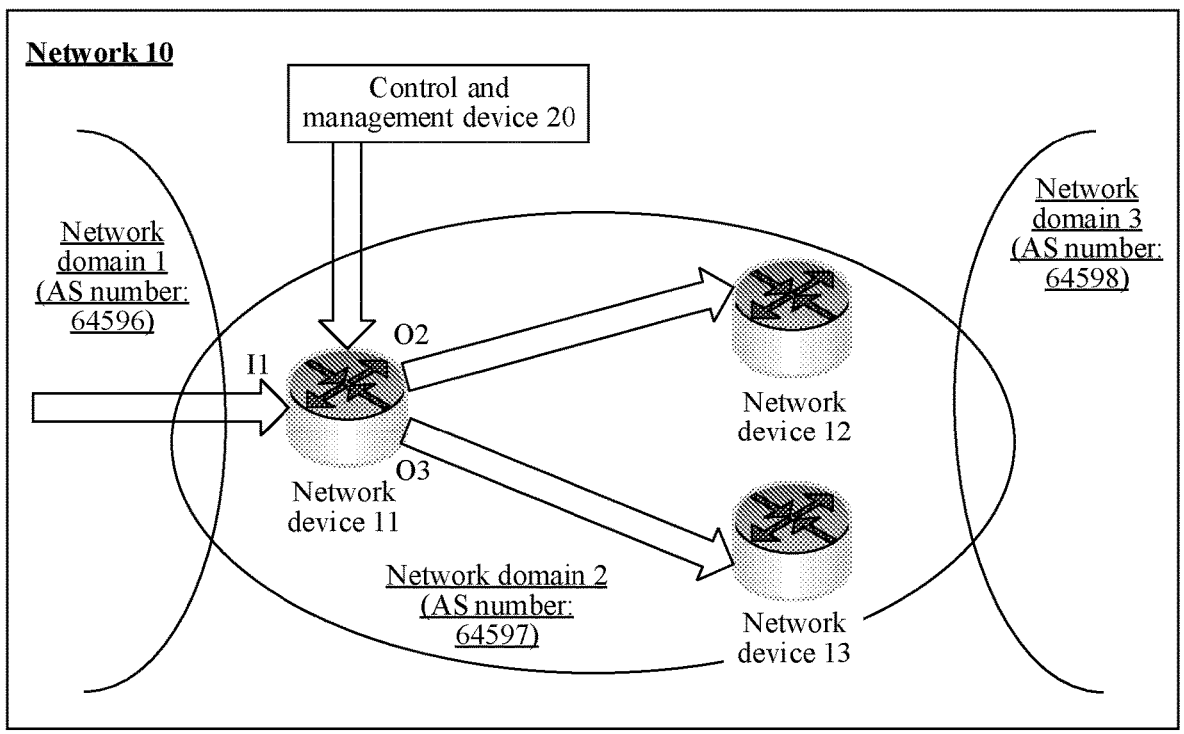
FIG. 1 is a schematic diagram of a structure of a network included in an application scenario according to an embodiment of this disclosure.

For example, a network 10 shown in FIG. 1 is used as an example. The network 10 may include a network domain 1, a network domain 2, and a network domain 3. AS numbers corresponding to the network domain 1, the network domain 2, and the network domain 3 are respectively 64596, 64597, and 64598. The network domain 2 includes a network device 11, a network device 12, and a network device 13. The network 10 may further include a control and management device 20. Assuming that the network device 11 is connected to the network domain 1 through an interface I1, is connected to the network device 12 through an interface O2, and is connected to the network device 13 through an interface O3, the control and management device 20 can manage and control the network devices in the network 10.

Currently, the network device 11 includes a FIB table entry 1. The FIB table entry 1 includes a prefix 1 and O2 (that is, an identifier of a next-hop outgoing interface from the network device 11 to the network device 12). In this way, when the network device 11 receives a packet 1 from the network domain 1, the packet 1 includes a destination address 1. In this case, a process of processing the packet 1 by the network device 11 may include: S11. The network device 11 views a FIB table to determine that the destination address 1 matches the prefix 1 in the FIB table entry 1, and obtains a next-hop outgoing interface O2 in the FIB table entry 1. S12. The network device 11 forwards the packet 1 from the outgoing interface O2 to the network device 12. In this way, the network device 11 can forward the traffic based on the FIB table.

Assuming that traffic received from the network domain 1 needs to pass through the network domain 2 to reach the network domain 3, and after the traffic enters the network domain 2 from the network device 11, in many scenarios, the traffic needs to be redirected to the network device 13, and the network device 13 forwards the traffic from the network domain 2 to the network domain 3. A scenario in which the network device 11 redirects traffic to the network device 13 includes, but is not limited to: Scenario 1: Traffic borne on the network device 12 is relatively large and has a severe packet loss, but traffic borne on the network device 13 is relatively small, and for the purpose of traffic balancing scheduling, traffic received by the network device 11 may be redirected to the network device 13. Scenario 2: To prevent an attack, the network device 11 redirects the received traffic to the network device 13 for traffic cleaning, thereby improving network security. That the network device 11 directs the traffic to the network device 13 may be a processing operation performed by the network device 11, based on the BGP FlowSpec information, on the traffic received by the network device 11 after the control and management device 20 sends the BGP FlowSpec information to the network device 11. Before the network device processes traffic by using the BGP FlowSpec information, a preprocessing process that needs to be performed may include: S21. The control and management device 20 sends BGP FlowSpec information 1 to the network device 11, where the BGP FlowSpec information 1 includes a correspondence between 64598 (that is, an AS number corresponding to a destination address) and redirection to the network device 13 (that is, an action), and indicates the network device 11 to redirect all traffic destined for the AS 64598 to the network device 13. S22. The network device 11 generates a BGP FlowSpec routing table entry based on the BGP FlowSpec information 1, and adds an entry 1 to a BGP FlowSpec forwarding table, where the added BGP FlowSpec forwarding table entry 1 includes 64598 and O3 (that is, an identifier of a next-hop outgoing interface from the network device 11 to the network device 13). S23. The network device 11 receives BGP routes advertised by the network domain 3, and associates FIB table entries generated in the FIB table based on the BGP routes with the AS number (that is, with 64598). For example, a generated FIB table entry 1' associated with the AS number includes a prefix 1, 64598, and O2 (that is, an identifier of a next-hop outgoing interface from the network device 11 to the network device 12). In this way, when the network device 11 receives a packet 1 from the network domain 1, the packet 1 includes a destination address 1. In this case, a process of processing the packet 1 by the network device 11 may include: S24. The network device 11 views a FIB table to determine that the destination address 1 matches the prefix 1 in the FIB table entry 1', and obtains the AS number 64598 in the FIB table entry 1'. S25. The network device 11 views the BGP FlowSpec forwarding table to determine the BGP FlowSpec forwarding table entry 1 whose AS number is 64598, and obtains the next outgoing interface O3 in the BGP FlowSpec forwarding table entry 1. S26. The network device 11 forwards the packet 1 from the outgoing interface O3 to the network domain 3 through the network device 13. It can be learned that, based on the existing BGP FlowSpec, at least two table lookup operations need to be performed for traffic processing, and the network device 11 has a performance loss.

In an example, based on the traffic processing method provided in embodiments of this disclosure, before traffic is processed by using the BGP FlowSpec, a preprocessing process that needs to be performed may include: S21. The control and management device 20 sends BGP FlowSpec information 1 to the network device 11, where the BGP FlowSpec information 1 includes a correspondence between 64598 and redirection to the network device 13 (which, for example, may be an identifier O3 of a next outgoing interface from the network device 11 to the network device 13). S22. The network device 11 generates a BGP FlowSpec routing table entry based on the BGP FlowSpec information 1. S23. The network device 11 receives BGP routes advertised by the network domain 3, and generates, in a FIB table, a FIB table entry 2 based on the BGP routes and the BGP FlowSpec information 1, where the FIB table entry 2 includes a prefix 2 and O3. In this way, when the network device 11 receives a packet 2 from the network domain 1, the packet 2 includes a destination address 2. In this case, a process of processing the packet 2 by the network device 11 may include: S24. The network device 11 views a FIB table to determine that the destination address 2 matches the prefix 2 in the FIB table entry 2, and obtains a next-hop outgoing interface O3 in the FIB table entry 1. S25. The network device 11 forwards the packet 2 from the outgoing interface O3 to the network domain 3 through the network device 13. It can be learned that, based on the method provided in embodiments of this disclosure, by using the BGP FlowSpec, only one table lookup operation needs to be performed for traffic processing, that is, the traffic can be accurately forwarded by viewing only the FIB table, thereby improving processing efficiency of the network device.

It should be noted that the network device refers to a device, such as a router, a switch, or a firewall, that has a packet forwarding function. The control and management device is a device or a functional module that has functions of generating BGP FlowSpec information and sending the BGP FlowSpec information to network devices, for example, may be a controller, a server, a network device, or a control and management module in the network device.

With reference to accompanying drawings, the following describes in detail specific implementations of a traffic processing method in embodiments of this disclosure based on embodiments.

Figure 2:
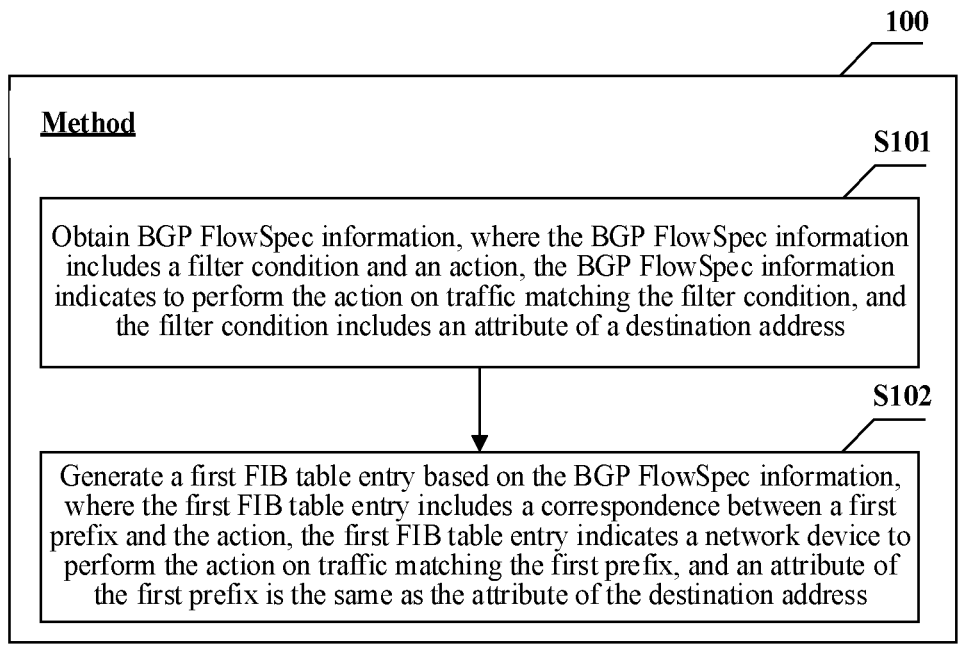
FIG. 2 is a schematic flowchart of a traffic processing method according to an embodiment of this disclosure.

FIG. 2 is a flowchart of signaling of a traffic processing method 100 according to an embodiment of this disclosure. Referring to FIG. 2, the method 100 is applied to a network device. For example, the method 100 may be applied to the network device 11 shown in FIG. 1, to process traffic sent from the network domain 1 to the network domain 3 through the network device 11 in the network domain 2. In another example, the method 100 may also be applied to the network device 13 shown in FIG. 1, to process traffic sent from the network domain 3 to the network domain 1 through the network device 13 in the network domain 2. During specific implementation, the method 100 may include, for example, the following S101 to S102.

S101. Obtain BGP FlowSpec information, where the BGP FlowSpec information includes a filter condition and an action, the BGP FlowSpec information indicates to perform the action on traffic matching the filter condition, and the filter condition includes an attribute of a destination address.

The BGP FlowSpec information may be information carried in a BGP FlowSpec route obtained by the network device. The filter condition in the BGP FlowSpec information may indicate a destination address having a specific attribute. Therefore, traffic matching the filter condition is traffic whose destination address has the specific attribute. The action in the BGP FlowSpec information is an operation that is in the BGP FlowSpec information and that needs to be performed on the traffic matching the filter condition.

For example, the filter condition may also be an AS number set to which the destination address belongs. For example, in the network 10 shown in FIG. 1, the filter condition in the BGP FlowSpec information obtained by the network device 11 may be an AS number of the network domain 3: 64598. The BGP FlowSpec information indicates to perform a corresponding action on traffic of the AS number to which the destination address belongs and that is 64598.

In another example, the filter condition may be an AS number set corresponding to the destination address. For example, assuming that traffic sent from a network domain 0 needs to reach a network domain 4 through a network domain 1, a network domain 2, and a network domain 3, the filter condition in the BGP FlowSpec information obtained by the network device in the network domain 1 may be a set of AS numbers corresponding to the network domain 2, the network domain 3, and the network domain 4: {64597, 64598, 64599}. The BGP FlowSpec information indicates to perform a corresponding action on traffic matching the AS number set. The traffic matching the AS number set may mean that a destination address of the traffic matches at least one AS number in the AS number set, or may mean that a destination address of the traffic matches all AS numbers in the AS number set. For example, the filter condition may be an ordered set (also referred to as an AS-Path) {64599, 64598, 64597} of a group of AS numbers, and represents that only traffic transmitted in sequence through all network domains indicated by the AS number set meets the filter condition. Therefore, after the network device receives traffic, only when a destination address of the traffic matches all AS numbers in the AS-Path, the device processes the traffic based on the action corresponding to the AS-Path attribute in the BGP FlowSpec information.

In another example, the filter condition may also be a community attribute corresponding to the destination address. The community attribute corresponding to the destination address may refer to information carried in a community attribute or an extended community attribute carried, when a BGP packet is for advertising BGP routes corresponding to the destination address, in the BGP packet for advertising the BGP routes, where the information indicates at least one destination address that meets one or some same features. For example, the filter condition may be a community attribute 100:100, where 100:100 indicates a set of addresses of all network devices in the network domain 1 and the network domain 2. That is, when BGP routes corresponding to the addresses of all the network devices in the network domain 1 and the network domain 2 are advertised, all community attributes carried in the BGP packet are 100:100. After the network device receives traffic, if a community attribute corresponding to a destination address of the traffic is 100:100, it is considered that the traffic meets the filter condition, and the traffic may be processed based on the action in the BGP FlowSpec information.

For example, the action in the BGP FlowSpec information may be any implementable processing operation on traffic, for example, may include any one of the following actions: redirection, packet discarding, rate limiting, or QoS level setting. Redirection means that traffic that meets a filter condition is directionally sent to a specific network device. For example, in the network 10 shown in FIG. 1, traffic that is received by the network device 11 and whose destination address belongs to the AS 64598 may be directionally sent to the network device 13. An action performed in this process is redirection. The action in the BGP FlowSpec information may be redirection to an IP address of the network device 13. Packet discarding refers to performing packet discarding on traffic that meets a filter condition. Rate limiting refers to limiting a rate of traffic that meets a filter condition. QoS level setting refers to setting a QoS level for traffic that meets a filter condition.

For the implementation of obtaining the BGP FlowSpec information in S101, in one case, the control and management device sends a control packet to the network device, and the network device parses the received control packet to obtain the BGP FlowSpec information carried in the control packet. The control and management device may be a controller, or may be another network device (which may also be referred to as a forwarding device) other than the network device that performs the method 100. In another case, the control and management module may be integrated into the network device. In this way, the network device may obtain the BGP FlowSpec information from the control and management module of the network device. In still another case, the BGP FlowSpec information may alternatively be locally configured on the network device. In this way, the network device may obtain the BGP FlowSpec information from the local configuration information.

Through S101, the network device obtains the BGP FlowSpec information, to provide a data basis for performing S102, so that it is possible to process traffic by using the BGP FlowSpec.

S102. Generate a first FIB table entry based on the BGP FlowSpec information, where the first FIB table entry includes a correspondence between a first prefix and the action, the first FIB table entry indicates the network device to perform the action on traffic matching the first prefix, and an attribute of the first prefix is the same as the attribute of the destination address.

It should be noted that, after obtaining the BGP FlowSpec information, the network device may generate a plurality of FIB table entries based on the BGP FlowSpec information, and an attribute of a prefix of each FIB table entry in the plurality of generated FIB table entries is the same as an attribute of a destination address included in the filter condition. For example, the network device generates a first FIB table entry and a second FIB table entry based on the BGP FlowSpec information, as shown in the following Table 1:

TABLE 1

| FIB table entry generated based on BGP FlowSpec information | | |
|---|---|---|
| First FIB table entry | First prefix | Action |
| Second FIB table entry | Second prefix | Action |

An attribute of the first prefix is the same as an attribute of the second prefix, and both are the same as the attribute of the destination address included in the filter condition. For example, if the attribute of the destination address included in the filter condition is an AS number 64598, both the first prefix and the second prefix belong to an AS corresponding to the AS number 64598. In another example, if the attribute of the destination address included in the filter condition is an AS number set {64596, 64597, 64598}, both the first prefix and the second prefix belong to the AS number set. For example, the first prefix and the second prefix both match 64596, 64597, and 64598. In another example, if the attribute of the destination address included in the filter condition is a community attribute 100:100 corresponding to the destination address, both the first prefix and the second prefix belong to a prefix range indicated by 100:100. An action in Table 1 may be flexibly represented. For example, if the action is redirection to the network device 13, the action in the FIB table entry may be an IP address of the network device 13.

An example in which the first FIB table entry is generated based on the BGP FlowSpec information is used below to exemplify an implementation in which the FIB table entry is generated based on the BGP FlowSpec information.

Figure 3:
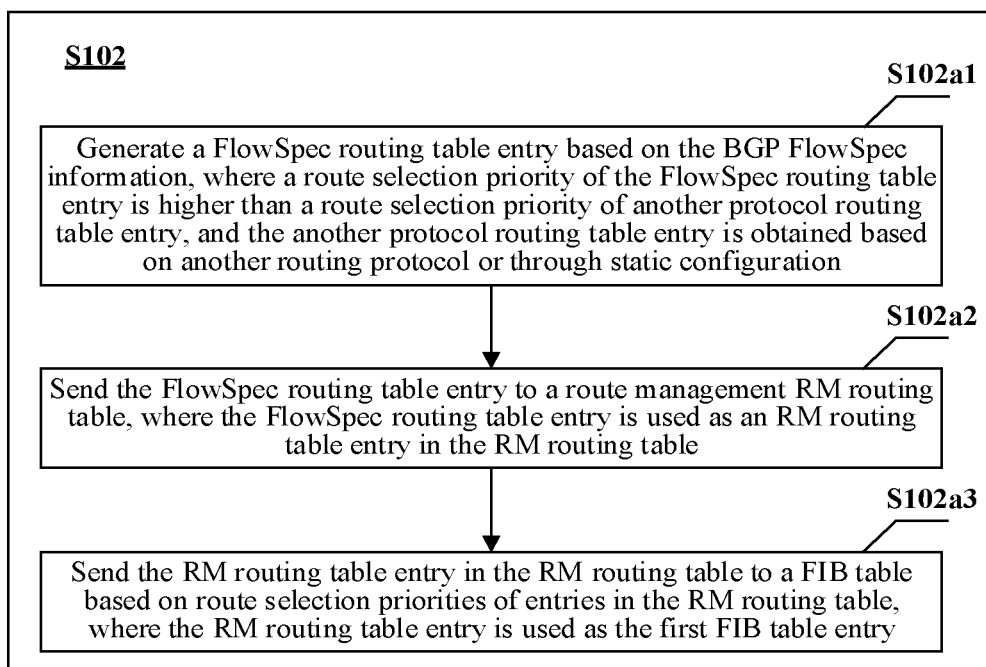
FIG. 3 is a schematic flowchart of an implementation of a traffic processing method step according to an embodiment of this disclosure.

In an example, the implementation of S102, as shown in FIG. 3, may include: S102*a*1. Generate a FlowSpec routing table entry based on the BGP FlowSpec information, where a route selection priority of the FlowSpec routing table entry is higher than a route selection priority of another protocol routing table entry, and the other protocol routing table entry is obtained based on another routing protocol or through static configuration. S102*a*2. Send the FlowSpec routing table entry to an RM routing table, where the FlowSpec routing table entry is used as an RM routing table entry in the RM routing table. S102*a*3. Send the RM routing table entry in the RM routing table to a FIB table based on route selection priorities of entries in the RM routing table, where the RM routing table entry is used as the first FIB table entry. It should be noted that, for example, S102*a*3 may be: sending all RM routing table entries corresponding to various route selection priorities in the RM routing table to the FIB table, and reflecting, in the FIB table, route selection priorities of FIB table entries corresponding to the RM routing table entries. Alternatively, for example, S102*a*3 may be sending RM routing table entries whose route selection priority is lower than a preset threshold in the RM routing table to the FIB table, and reflecting, in the FIB table, route selection priorities of FIB table entries corresponding to the RM routing table entries. Alternatively, for example, S102*a*3 may be sending an RM routing table entry (that is, a FlowSpec routing table entry) with a highest route selection priority in the RM routing table to the FIB table, so that the FlowSpec routing table entry in the FIB table is the first FIB table entry in S102. At least two FIB table entries with a same prefix are stored in the FIB table, so as to ensure that when a link or a network device on a link indicated by a FIB table entry fails, traffic forwarding is guided based on the other FIB table entry with the same prefix.

The route selection priorities in this example may be values set by the network device for various routes based on actual requirements and for determining priorities of the routes. Generally, the route selection priorities of the routes range from 0 to 255. The smaller the value of the route selection priority, the higher the route selection priority of the corresponding route.

In this example, the network device may establish a FlowSpec routing table, and set a route selection priority of the FlowSpec routing table to be higher than a route selection priority of another routing table. For example, it is assumed that the network device has a BGP routing table, an Open Shortest Path First (OSPF) routing table, an Intermediate System to Intermediate System (ISIS) routing table, and a static routing table. If a route selection priority of the static routing table is 5, a route selection priority of the OSPF routing table is 10, a route selection priority of the ISIS routing table is 15, and a route selection priority of the BGP routing table is 160, a route selection priority of the FlowSpec routing table may be set to 2, which is higher than route selection priorities of other routing tables.

It should be noted that, the network device may include a plurality of routing tables, and routing tables corresponding to different routing protocols may be respectively maintained based on the routing protocols. Alternatively, the network device may include only one routing table, and different routing protocols indicate, in the routing table based on labels, routing table entries corresponding to the routing protocols. In the following example, each routing protocol corresponds to a routing table.

Figure 4:
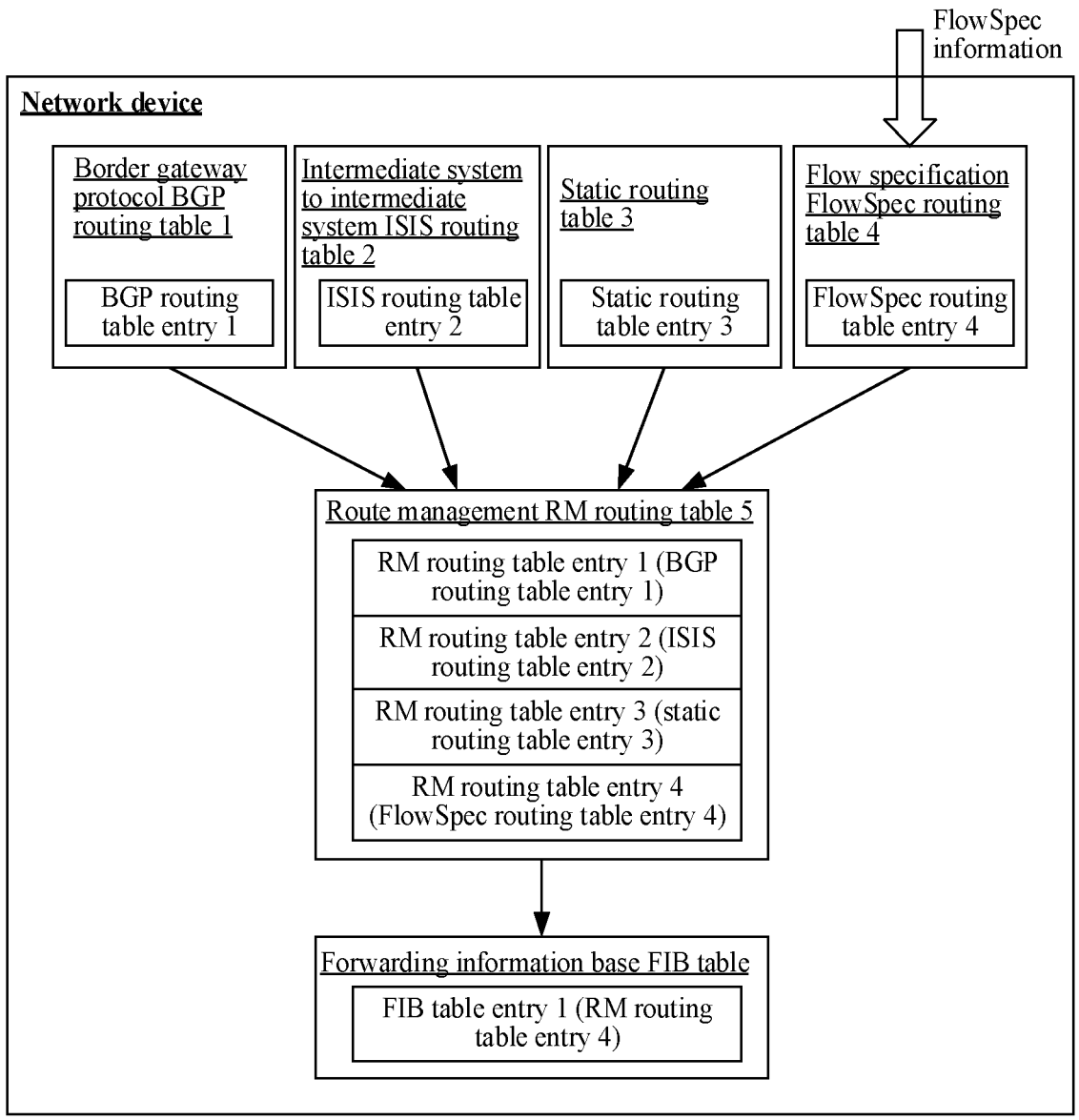
FIG. 4 is a schematic diagram of various entries in a network device according to an embodiment of this disclosure.

As shown in FIG. 4, it is assumed that the network device includes a BGP routing table 1, an ISIS routing table 2, a static routing table 3, and a FlowSpec routing table 4, and the BGP routing table 1, the ISIS routing table 2, and the static routing table 3 respectively include a BGP routing table entry 1, an ISIS routing table entry 2, and a static routing table entry 3 that correspond to a prefix 1. When receiving the BGP FlowSpec information, the network device generates, in the FlowSpec routing table, a FlowSpec routing table entry 4 corresponding to the prefix 1, where an attribute of the prefix 1 is the same as an attribute of a destination address included in a filter condition in the BGP FlowSpec information. In this way, the BGP routing table 1, the ISIS routing table 2, the static routing table 3, and the FlowSpec routing table 4 in the network device may all send the BGP routing table entry 1, the ISIS routing table entry 2, the static routing table entry 3, and the FlowSpec routing table entry 4 that correspond to the prefix 1 to an RM routing table 5 as RM routing table entries 1 to 4 in the RM routing table 5. The RM routing table 5 sends, based on route selection priorities corresponding to the received routing table entries, the RM routing table entry 4 (that is, a FlowSpec routing table entry 4 in the FIB table) with a highest route selection priority in the RM routing table entries 1 to 4 to the FIB table, in other words, the FIB table includes a FIB table entry 1 (that is, the RM routing table entry 4 or the FlowSpec routing table entry 4). In this way, for a received packet whose destination address matches the prefix 1, the network device may perform corresponding processing on the packet based on the action in the FIB table entry 1 in the FIB table.

Routing table entries of routing tables, such as the BGP routing table, the ISIS routing table, the static routing table, and the FlowSpec routing table, that are sent to the RM routing table may be routing table entries with a same prefix in the routing tables, or may be a preset quantity of routing table entries selected from routing table entries with a same prefix in the routing tables.

Figure 5:
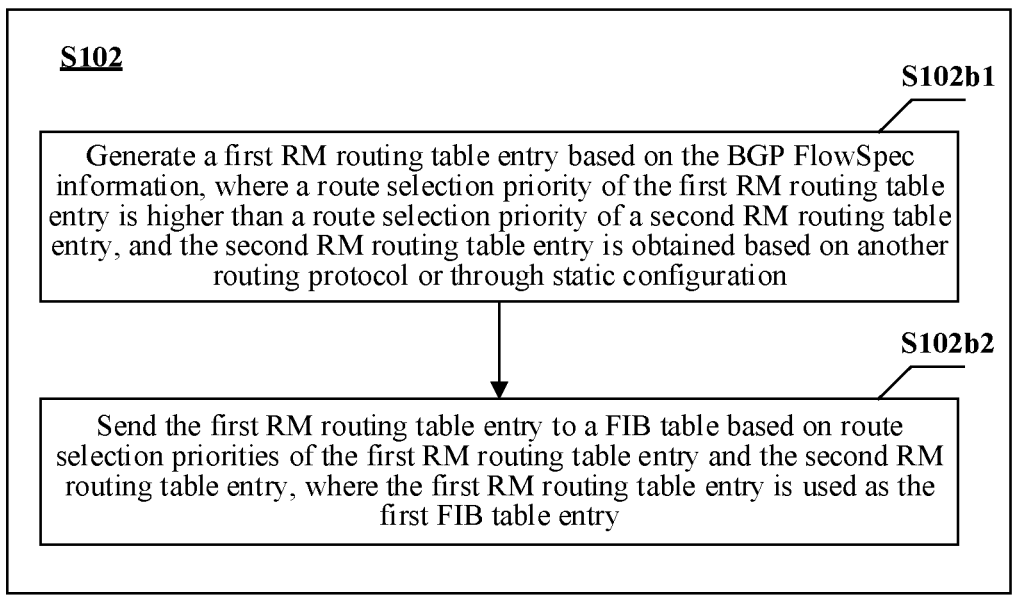
FIG. 5 is a schematic flowchart of another implementation of a traffic processing method step according to an embodiment of this disclosure.

In another example, the implementation of S102 may, as shown in FIG. 5, include: S102*b*1. Generate a first RM routing table entry based on the BGP FlowSpec information, where a route selection priority of the first RM routing table entry is higher than a route selection priority of a second RM routing table entry, and the second RM routing table entry is obtained based on another routing protocol or through static configuration. S102*b*2. Send the first RM routing table entry to a FIB table based on route selection priorities of the first RM routing table entry and the second RM routing table entry, where the first RM routing table entry is used as the first FIB table entry. It should be noted that, the second RM routing table entry may also be sent to the FIB table, but a route selection priority of a FIB table entry corresponding to the second RM routing table entry needs to be reflected in the FIB table.

It should be noted that, the network device may include a plurality of RM routing tables, a routing table obtained based on another routing protocol and a statically configured routing table correspond to the second RM routing table, and a routing table obtained based on the BGP FlowSpec information corresponds to the first RM routing table. The second RM routing table may also be referred to as a general routing table or an IP routing table, and the first RM routing table is a newly established and maintained routing table. Alternatively, the network device may include only one RM routing table, and different routing protocols indicate, in the RM routing table based on labels, RM routing table entries corresponding to the routing protocols. The following uses two RM routing tables as an example.

The route selection priorities in this example may be values set for various RM routing tables based on actual requirements and for determining priorities of the RM routing tables. Generally, the route selection priorities of the RM routing tables can be flexibly set. The smaller the value of the route selection priority, the higher the route selection priority of the corresponding RM routing table. Alternatively, the route selection priorities in this example may be values set by the network device for various routes based on actual requirements and for determining priorities of the routes. The route selection priorities are reflected in RM forwarding table entries of RM forwarding tables. The route selection priorities of the RM routing table entries are reflected by route selection priorities of routes corresponding to the RM routing table entries.

In this example, the network device may establish a FlowSpec routing table and a first RM routing table, and set a route selection priority of the first RM routing table to be higher than a route selection priority of the first RM routing table. For example, assuming that a BGP routing table, an OSPF routing table, an ISIS routing table, and a static routing table exist in the network device, the BGP routing table, the OSPF routing table, the ISIS routing table, and the static routing table all send routing table entries to a second RM routing table, and a route selection priority of the second RM routing table is 100, a route selection priority of the first RM routing table may be set to 17, which is higher than the route selection priority of the second routing table.

Figure 6:
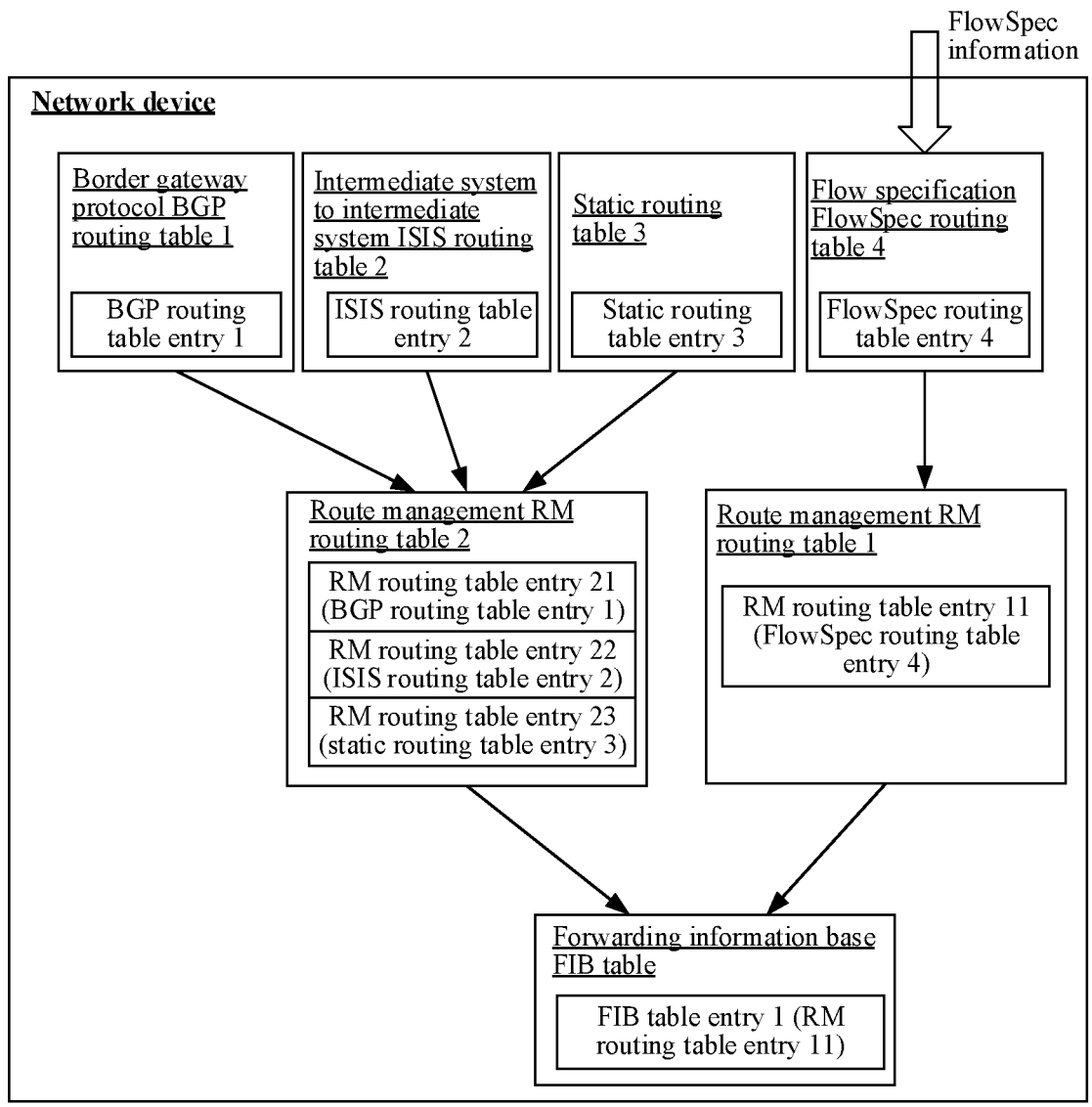
FIG. 6 is a schematic diagram of various entries in another network device according to an embodiment of this disclosure.

As shown in FIG. 6, it is assumed that the network device includes a BGP routing table 1, an ISIS routing table 2, a static routing table 3, and a FlowSpec routing table 4, the BGP routing table 1, the ISIS routing table 2, and the static routing table 3 respectively include a BGP routing table entry 1, an ISIS routing table entry 2, and a static routing table entry 3 that correspond to a prefix 1, the BGP routing table 1, the ISIS routing table 2, and the static routing table 3 respectively deliver entries to an RM routing table 2, that is, the RM routing table 2 includes RM routing table entries 21 to 23 (corresponding to the BGP routing table entry 1, the ISIS routing table entry 2, and the static routing table entry 3 respectively). When receiving the BGP FlowSpec information, the network device generates, in the FlowSpec routing table, a FlowSpec routing table entry 4 corresponding to the prefix 1, where an attribute of the prefix 1 is the same as an attribute of a destination address included in a filter condition in the BGP FlowSpec information. In this way, the network device may send the FlowSpec routing table entry 4 to the RM routing table 1 as an RM routing table entry 11 in the RM routing table 1. In this way, the network device may obtain route selection priorities of the RM routing table 1 and the RM routing table 2, and determine that the route selection priority of the RM routing table 1 is higher. Then, the network device sends the RM routing table entry 11 (that is, the FlowSpec routing table entry 4) in the RM routing table 1 to the FIB table, that is, the FIB table includes the FIB table entry 1 (that is, the RM routing table entry 11 or the FlowSpec routing table entry 4). In this way, for a received packet whose destination address matches the prefix 1, the network device may perform corresponding processing on the packet based on the action in the FIB table entry 1 in the FIB table.

In some cases, if a plurality of same routing table entries with different route selection priorities exist in both the RM routing table 1 and the RM routing table 2, in addition to delivering only an RM routing table entry with the highest route selection priority to the FIB table, an RM routing table entry with a non-highest route selection priority may also be delivered to the FIB table. In this way, the FIB table entry with the non-highest route selection priority may be used as a backup entry of the corresponding FIB table entry with the highest route selection priority. When the FIB table entry with the highest route selection priority is withdrawn, the backup entry with the non-highest route selection priority can forward traffic in a timely manner, thereby improving the forwarding performance of the network device.

It should be noted that, the other routing protocol described in the foregoing example may include a BGP or an IGP, and for example, the IGP may include, but is not limited to, the ISIS protocol and the OSPF protocol mentioned above.

After S102, the network device combines the BGP FlowSpec information into a FIB table entry whose prefix meets the filter condition and that is in the FIB table, so as to prepare the network device for processing traffic based on the BGP FlowSpec.

After S102, when the network device receives a packet, and a destination address of the packet matches the first prefix in the first FIB table entry, the network device processes the packet based on the action in the first FIB table entry. Alternatively, when the network device receives a packet, and a destination address of the packet matches the second prefix in the second FIB table entry, the network device processes the packet based on the action in the second FIB table entry.

It can be learned that, through the method 100 provided in embodiments of this disclosure, the network device can generate a first FIB table entry based on obtained BGP FlowSpec information. The first FIB table entry includes a correspondence between a first prefix and an action. The action is an action included in the BGP FlowSpec information. The first prefix is a prefix having a same attribute as a destination address indicated by a filter condition included in the BGP FlowSpec information. The BGP FlowSpec information indicates to perform the action on traffic matching the filter condition, and the generated first FIB table entry indicates the network device to perform the action on traffic matching the first prefix. Therefore, the network device only needs to view a FIB table for received traffic to determine that the traffic matches the first prefix in the first FIB table entry, so as to process the traffic based on the action in the first FIB table entry, and process the traffic based on the BGP FlowSpec without performing a plurality of table lookup operations on the received traffic, thereby greatly improving efficiency of processing the traffic by the network device and improving performance of the network device. In addition, in the method 100, the network generates and maintains BGP FlowSpec routes in batches, and generates, in the FIB table, a FIB table entry with a BGP FlowSpec route taken into account, thereby reducing configuration and maintenance costs.

Figure 7:
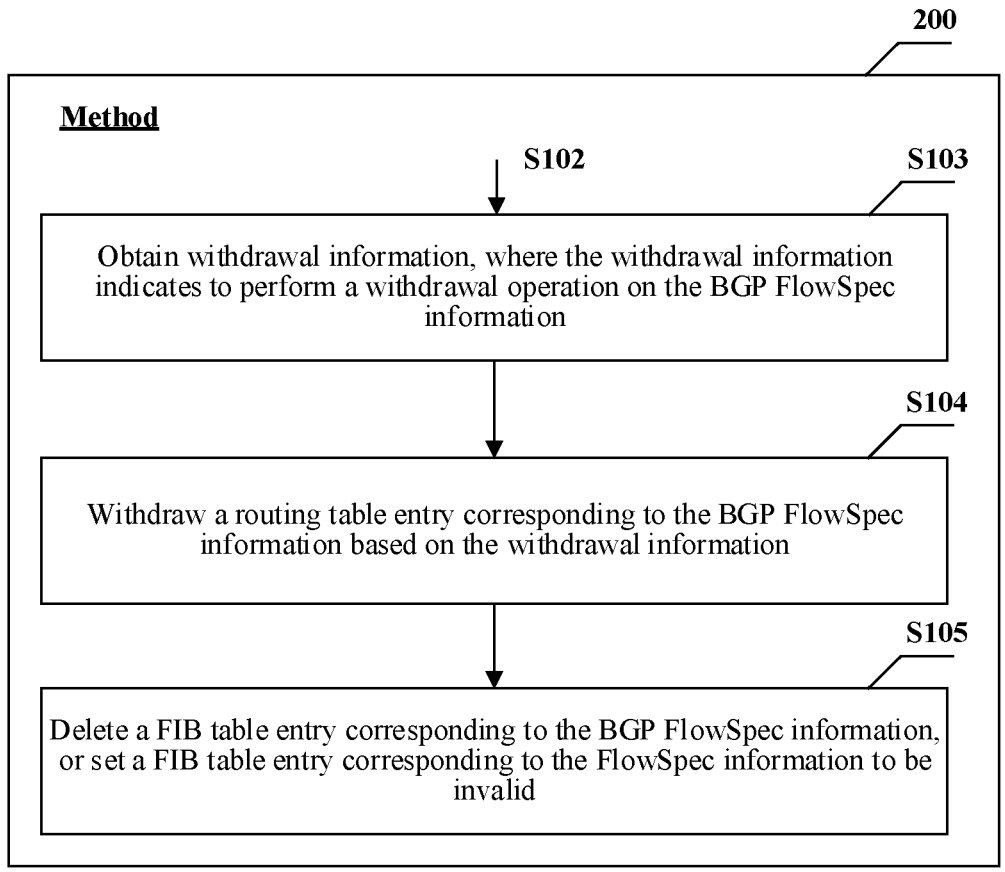
FIG. 7 is a flowchart of signaling of a traffic processing method according to an embodiment of this disclosure.

In some possible implementations, in addition to generating, in batches, FIB table entries corresponding to a BGP FlowSpec route, the network device may also withdraw a BGP FlowSpec route, so as to withdraw, in batches, routing table entries corresponding to the BGP FlowSpec route and the FIB table entries corresponding to the BGP FlowSpec route, thereby improving user experience of the network device. During specific implementation, embodiments of this disclosure provide a traffic processing method 200. As shown in FIG. 7, after S102, the method 200 may further include the following steps:

S103. Obtain withdrawal information, where the withdrawal information indicates to perform a withdrawal operation on the BGP FlowSpec information.

S104. Withdraw a routing table entry corresponding to the BGP FlowSpec information based on the withdrawal information.

S105. Delete a FIB table entry corresponding to the BGP FlowSpec information, or set a FIB table entry corresponding to the FlowSpec information to be invalid.

For S103, the network device may receive the withdrawal information sent by the control and management device, or the withdrawal information may be configured on the network device, that is, the network device obtains the withdrawal information from local configuration information.

For S104, in a case, if S102 is implemented through S102a1 to S102a3 shown in FIG. 3, for example, S104 may include: the network device withdraws a FlowSpec routing table entry based on the withdrawal information. Therefore, the RM routing table entry corresponding to the FlowSpec routing table entry in the RM routing table may be deleted, and the FIB table entry corresponding to the BGP FlowSpec information may be further deleted, or the FIB table entry corresponding to the FlowSpec information is set to be invalid. For example, for various entries, shown in FIG. 4, in the network device, after the method 200, the FlowSpec routing table entry 4 is deleted from the FlowSpec routing table 4, the RM routing table entry 4 is deleted from the RM routing table 5, and the FIB table entry 1 is deleted from the FIB table, or the FIB table entry 1 is set to an invalid state.

In another case, if S102 is implemented through S102b1 to S102b2 shown in FIG. 5, for example, S104 may include: the network device withdraws a first RM routing table entry based on the withdrawal information. In this way, a FIB table entry corresponding to the BGP FlowSpec information may be deleted, or a FIB table entry corresponding to the FlowSpec information may be set to be invalid. For example, for various entries, shown in FIG. 6, in the network device, after the method 200, the FlowSpec routing table entry 4 is deleted from the FlowSpec routing table 4, the RM routing table entry 11 is deleted from the RM routing table 1, and the FIB table entry 1 is deleted from the FIB table, or the FIB table entry 1 is set to an invalid state.

It should be noted that, "a FIB table entry corresponding to the BGP FlowSpec information" mentioned in S105 refers to all or some FIB table entries generated based on the BGP FlowSpec information. An attribute of a prefix in a FIB table entry corresponding to the BGP FlowSpec information is the same as an attribute of a destination address included in a filter condition in the BGP FlowSpec information, or it may be considered that a prefix in a FIB table entry corresponding to the BGP FlowSpec information meets a filter condition in the BGP FlowSpec information.

It can be learned that, through the method 200 provided in embodiments of this disclosure, the network device not only can generate a corresponding FIB table entry based on the obtained BGP FlowSpec information, for indicating the network device to perform a corresponding action in the BGP FlowSpec information on traffic matching a prefix in the generated FIB table entry, so that the traffic can be processed based on the BGP FlowSpec through one table lookup operation, but also can withdraw a BGP FlowSpec route based on obtained withdrawal information, to withdraw, in batches, routing table entries corresponding to the BGP FlowSpec route and FIB table entries corresponding to the BGP FlowSpec route, thereby simplifying configuration and maintenance costs, making traffic control based on the BGP FlowSpec more flexible, and improving user experience of the network device.

Figure 8:
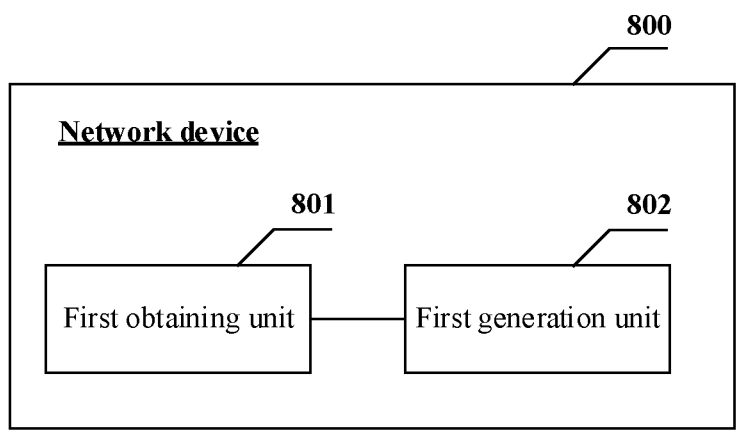
FIG. 8 is a schematic diagram of a structure of a network device according to an embodiment of this disclosure.

Correspondingly, embodiments of this disclosure further provide a network device 800, as shown in FIG. 8. The network device 800 includes a first obtaining unit 801 and a first generation unit 802.

The first obtaining unit 801 is configured to obtain BGP FlowSpec information, where the BGP FlowSpec information includes a filter condition and an action, the BGP FlowSpec information indicates to perform the action on traffic matching the filter condition, and the filter condition includes an attribute of a destination address. The first obtaining unit 801 may perform S101 shown in FIG. 2.

The first generation unit 802 is configured to generate a first FIB table entry based on the BGP FlowSpec information, where the first FIB table entry includes a correspondence between a first prefix and the action, the first FIB table entry indicates the network device to perform the action on traffic matching the first prefix, and an attribute of the first prefix is the same as the attribute of the destination address. The first generation unit 802 may perform S102 shown in FIG. 2.

In an example, the network device 800 may further include a receiving unit, a determining unit, and a processing unit. The receiving unit is configured to receive a packet. The determining unit is configured to determine that a destination address of the packet matches the first prefix in the first FIB table entry. The processing unit is configured to process the packet based on the action.

In an example, the first obtaining unit 801 is further configured to receive a control packet sent by a control and management device. The control packet carries the BGP FlowSpec information, and the control and management device includes a controller or a forwarding device. Alternatively, the first obtaining unit 801 is further configured to obtain the BGP FlowSpec information from local configuration information.

The attribute of the destination address in the filter condition may be an AS number to which the destination address belongs or a set of AS numbers corresponding to the destination address. Alternatively, the attribute of the destination address in the filter condition may be a community attribute corresponding to the destination address.

The action in the BGP FlowSpec information includes any one of the following actions: redirection, packet discarding, rate limiting, or QoS level setting.

In some possible implementations, the first generation unit 802 may include a first generation subunit, a first sending subunit, and a second sending subunit. The first generation subunit is configured to generate a FlowSpec routing table entry based on the BGP FlowSpec information. A route selection priority of the FlowSpec routing table entry is higher than a route selection priority of another routing table entry, and the other routing table entry is obtained based on another routing protocol or through static configuration. The first sending subunit is configured to send the FlowSpec routing table entry to an RM routing table, where the FlowSpec routing table entry is used as an RM routing table entry in the RM routing table. The second sending subunit is configured to send the RM routing table entry in the RM routing table to a FIB table based on route selection priorities of entries in the RM routing table, where the RM routing table entry is used as the first FIB table entry.

In this implementation, the network device 800 may further include a second obtaining unit and a first withdrawal unit. The second obtaining unit is configured to obtain first withdrawal information. The first withdrawal information indicates to perform a withdrawal operation on the BGP FlowSpec information. The first withdrawal unit is configured to withdraw the FlowSpec routing table entry based on the first withdrawal information.

In another possible implementation, the first generation unit 802 may also include a second generation unit and a third sending subunit. The second generation subunit is configured to generate a first RM routing table entry based on the BGP FlowSpec information. A route selection priority of the first RM routing table entry is higher than a route selection priority of a second RM routing table entry, and the second RM routing table entry is obtained based on another routing protocol or through static configuration. The third sending subunit is configured to send the first RM routing table entry to a FIB table based on route selection priorities of the first RM routing table entry and the second RM routing table entry, where the first RM routing table entry is used as the first FIB table entry.

In this implementation, the network device 800 may further include a third obtaining unit and a second withdrawal unit. The third obtaining unit is configured to obtain second withdrawal information. The second withdrawal information indicates to perform a withdrawal operation on the BGP FlowSpec information. The second withdrawal unit is configured to withdraw the first RM routing table entry based on the second withdrawal information.

In addition, in the foregoing two possible implementations, the network device 800 may further include a third withdrawal unit. The third withdrawal unit is configured to delete a FIB table entry corresponding to the BGP FlowSpec information, or set a FIB table entry corresponding to the FlowSpec information to be invalid.

The other routing protocol in the foregoing implementation may include: a BGP or an IGP.

In an example, the network device 800 may further include a second generation unit. The second generation unit is configured to generate a second FIB table entry based on the BGP FlowSpec information, where the second FIB table entry includes a correspondence between a second prefix and the action, the second FIB table entry indicates the network device to perform the action on traffic matching the second prefix, an attribute of the second prefix is the same as the attribute of the destination address, and the second prefix is different from the first prefix.

It should be noted that the network device 800 shown in FIG. 8 may be the network device in the example shown in FIG. 2 or FIG. 7. Therefore, for various specific embodiments of the network device 800, refer to related descriptions of the method 100 corresponding to FIG. 2 and the method 200 corresponding to FIG. 7. Details are not described again in this embodiment.

Figure 9:
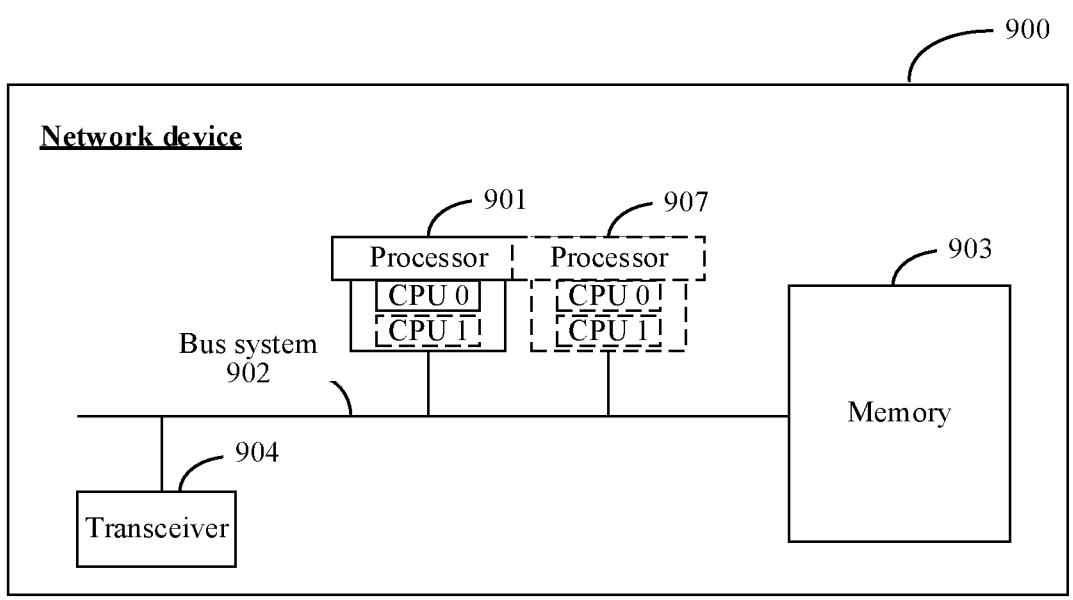
FIG. 9 is a schematic diagram of a structure of a network device according to an embodiment of this disclosure.

Refer to FIG. 9. Embodiments of this disclosure provide a network device 900. The network device 900 may be the network device in any one of the foregoing embodiments, for example, may be the network device 11 in the embodiment shown in FIG. 1, or may be the network device in the embodiment shown in FIG. 2. The network device 900 includes at least one processor 901, a bus system 902, a memory 903, and at least one transceiver 904.

The network device 900 is an apparatus of a hardware structure, and may be configured to implement functional modules in the network device 800 shown in FIG. 8. For example, a person skilled in the art may figure out that the first generation unit 802 in the network device 800 shown in FIG. 8 may be implemented by the at least one processor 901 by invoking code in the memory 903, and the first obtaining unit 801 in the network device 800 shown in FIG. 8 may be implemented by the transceiver 904.

Optionally, the network device 900 may be further configured to implement a function of the network device in any one of the foregoing embodiments.

Optionally, the processor 901 may be a general-purpose central processing unit (CPU), a network processor (NP), a microprocessor, an application-specific integrated circuit (ASIC), or one or more integrated circuits configured to control program execution of solutions of this disclosure.

The bus system 902 may include a path for transmitting information between the foregoing components.

The transceiver 904 is configured to communicate with another device or a communication network.

The memory 903 may be a read-only memory (ROM) or another type of static storage device that can store static information and instructions, a random-access memory (RAM) or another type of dynamic storage device that can store information and instructions; or may be an electrically erasable programmable read-only memory (EEPROM), a compact disc read-only memory (CD-ROM) or another compact disc storage, optical disc storage (including a compact disc, a laser disc, an optical disc, a digital versatile disc (DVD), a BLU-RAY disc, or the like), and a disk storage medium or another disk storage device, or any other medium that can be used to carry or store expected program code in a form of instructions or a data structure and that can be accessed by a computer. However, the memory 903 is not limited herein. The memory may exist independently, and is connected to the processor through the bus. The memory may alternatively be integrated with the processor.

The memory 903 is configured to store application program code for performing the solutions in this disclosure, and the application program code is executed under control of the processor 901. The processor 901 is configured to execute the application program code stored in the memory 903, to implement the function in the method in this patent.

During specific implementation, in an embodiment, the processor 901 may include one or more CPUs such as a CPU 0 and a CPU 1 in FIG. 9.

During specific implementation, in an embodiment, the network device 900 may include a plurality of processors, for example, the processor 901 and a processor 907 in FIG. 9. Each of the processors may be a single-core (single-CPU) processor, or may be a multi-core (multi-CPU) processor. The processor herein may be one or more devices, circuits, and/or processing cores configured to process data (for example, computer program instructions).

In addition, embodiments of this disclosure further provide a computer-readable storage medium. The computer-readable storage medium stores program code or instructions. When the program code or the instructions are run on a computer, the computer is enabled to perform the method according to any implementation of the foregoing embodiment shown in FIG. 2 or FIG. 7.

In addition, embodiments of this disclosure further provide a computer program product. When the computer program product is run on a computer, the computer is enabled to perform the method according to any implementation of the method 100, or the computer is enabled to perform the method according to any implementation of the method 200.

"First" in names, such as "first prefix" and "first FIB table entry", mentioned in embodiments of this disclosure is merely used as a name identifier, and does not represent the first in sequence. This rule is also applicable to "second" and the like.

It should be understood that "determining B based on A" mentioned in embodiments of this disclosure does not mean that B is determined based on only A, and B may also be determined based on A and/or other information.

From the foregoing descriptions of the implementations, a person skilled in the art may clearly understand that some or all steps of the methods in embodiments may be implemented by software in addition to a universal hardware platform. Based on such an understanding, the technical solutions of this disclosure may be implemented in a form of a software product. The computer software product may be stored in a storage medium, for example, a ROM)/RAM, a magnetic disk, or a compact disc, and includes several instructions for instructing a computer device (which may be a personal computer, a server, or a network communication device such as a router) to perform the methods described in embodiments or some parts of embodiments of this disclosure.

Embodiments in this specification are all described in a progressive manner, for same or similar parts in embodiments, reference may be made to these embodiments, and each embodiment focuses on a difference from other embodiments. Especially, apparatus and device embodiments are basically similar to the method embodiments, and therefore, are described briefly. For related parts, refer to partial descriptions in the method embodiments. The described device and system embodiments are merely examples. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of embodiments. A person of ordinary skill in the art may understand and implement embodiments of the present disclosure without creative efforts.

The foregoing descriptions are merely example implementations of this disclosure, but are not intended to limit the protection scope of this disclosure. It should be noted that a person of ordinary skill in the art may make some improvements and polishing without departing from this disclosure and the improvements and polishing shall fall within the protection scope of this disclosure.

What is claimed is:

1. A traffic processing method implemented by a network device, wherein the traffic processing method comprises:
    obtaining Border Gateway Protocol (BGP) flow specification (FlowSpec) information, wherein the BGP FlowSpec information comprises a filter condition and an action, wherein the BGP FlowSpec information indicates to perform the action on first traffic matching the filter condition, and wherein the filter condition comprises a first attribute of a first destination address; and
    generating, based on the BGP FlowSpec information, a first forwarding information base (FIB) table entry,
    wherein the first FIB table entry comprises a first correspondence between a first prefix and the action,
    wherein the first FIB table entry instructs the network device to perform the action on second traffic matching the first prefix, and
    wherein a second attribute of the first prefix is the same as the first attribute.

2. The traffic processing method of claim 1, further comprising:
    receiving a packet;
    determining that a second destination address of the packet matches the first prefix; and
    processing, based on the action, the packet.

3. The traffic processing method of claim 1, wherein obtaining the BGP FlowSpec information comprises receiving a control packet from a control and management device, and wherein the control packet carries the BGP FlowSpec information.

4. The traffic processing method of claim 1, wherein obtaining the BGP FlowSpec information comprises obtaining the BGP FlowSpec information from local configuration information.

5. The traffic processing method of claim 1, wherein the first attribute is an autonomous system (AS) number to which the first destination address belongs or a set of AS numbers corresponding to the first destination address.

6. The traffic processing method of claim 1, wherein the first attribute is a community attribute corresponding to the first destination address.

7. The traffic processing method of claim 1, wherein the action comprises redirection, packet discarding, rate limiting, or quality of service (QoS) level setting.

8. The traffic processing method of claim 1, wherein generating the first FIB table entry comprises:
    generating, based on the BGP FlowSpec information, a FlowSpec routing table entry, wherein a first route selection priority of the FlowSpec routing table entry is higher than a second route selection priority of another routing table entry, and wherein the other routing table entry is based on another routing protocol or static configuration;
    sending the FlowSpec routing table entry to a route management (RM) routing table, wherein the FlowSpec routing table entry is configured to be used as an RM routing table entry in the RM routing table; and
    sending, based on route selection properties of entries in the RM routing table, the RM routing table entry to a FIB table, and
    wherein the RM routing table entry is configured to be used as the first FIB table entry.

9. The traffic processing method of claim 8, further comprising:
    obtaining withdrawal information, wherein the withdrawal information indicates to perform a withdrawal operation on the BGP FlowSpec information; and
    withdrawing, based on the withdrawal information, the FlowSpec routing table entry.

10. The traffic processing method of claim 9, further comprising:
    deleting a second FIB table entry corresponding to the BGP FlowSpec information; or
    setting a third FIB table entry corresponding to the BGP FlowSpec information to be invalid.

11. The traffic processing method of claim 8, wherein the other routing protocol comprises BGP or an interior gateway protocol (IGP).

12. The traffic processing method of claim 1, wherein generating the first FIB table entry comprises:
    generating, based on the BGP FlowSpec information, a first route management (RM) routing table entry, wherein a first route selection priority of the first RM routing table entry is higher than a second route selection priority of a second RM routing table entry, and wherein the second RM routing table entry is based on another routing protocol or static configuration; and
    sending, based on route selection priorities of the first RM routing table entry and the second RM routing table entry, the first RM routing table entry to a FIB table, wherein the first RM routing table entry is configured to be used as the first FIB table entry.

13. The traffic processing method of claim 12, further comprising:
    obtaining withdrawal information, wherein the withdrawal information indicates to perform a withdrawal operation on the BGP FlowSpec information; and
    withdrawing, based on the withdrawal information, the first RM routing table entry.

14. The traffic processing method of claim 1, further comprising generating, based on the BGP FlowSpec information, a second FIB table entry, wherein the second FIB table entry comprises a second correspondence between a second prefix and the action, wherein the second FIB table entry instructs the network device to perform the action on third traffic matching the second prefix, wherein a third attribute of the second prefix is the same as the first attribute, and wherein the second prefix is different from the first prefix.

15. A network device, comprising:
a memory configured to store instructions; and
a processor coupled to the memory and configured to execute the instructions to:
  obtain Border Gateway Protocol (BGP) flow specification (FlowSpec) information, wherein the BGP FlowSpec information comprises a filter condition and an action, wherein the BGP FlowSpec information indicates to perform the action on first traffic matching the filter condition, and wherein the filter condition comprises a first attribute of a first destination address; and
  generate, based on the BGP FlowSpec information, a first forwarding information base (FIB) table entry,
  wherein the first FIB table entry comprises a first correspondence between a first prefix and the action,
  wherein the first FIB table entry instructs the network device to perform the action on second traffic matching the first prefix, and
  wherein a second attribute of the first prefix is the same as the first attribute.

16. The network device of claim 15, wherein the processor is further configured to execute the instructions to:
receive a packet;
determine that a second destination address of the packet matches the first prefix; and
process, based on the action, the packet.

17. The network device of claim 15, wherein the processor is further configured to execute the instructions to receive a control packet from a control and management device, wherein the control packet carries the BGP FlowSpec information, and wherein the control and management device comprises a controller or a forwarding device.

18. The network device of claim 15, wherein the processor is further configured to execute the instructions to obtain the BGP FlowSpec information from local configuration information.

19. The network device of claim 15, wherein the first attribute is an autonomous system (AS) number to which the first destination address belongs or a set of AS numbers corresponding to the first destination address.

20. A computer program product comprising instructions stored on a non-transitory computer-readable medium that, when executed by a processor, cause a network device to:
obtain Border Gateway Protocol (BGP) flow specification (FlowSpec) information, wherein the BGP FlowSpec information comprises a filter condition and an action, wherein the BGP FlowSpec information indicates to perform the action on first traffic matching the filter condition, and wherein the filter condition comprises a first attribute of a first destination address; and
generate, based on the BGP FlowSpec information, a first forwarding information base (FIB) table entry,
wherein the first FIB table entry comprises a first correspondence between a first prefix and the action,
wherein the first FIB table entry instructs the network device to perform the action on second traffic matching the first prefix, and
wherein a second attribute of the first prefix is the same as the first attribute.

* * * * *